(12) United States Patent
O'Ryan et al.

(10) Patent No.: US 10,933,685 B2
(45) Date of Patent: *Mar. 2, 2021

(54) DECORATIVE PANEL MADE OF FLAT GLASS

(71) Applicants: Schott Gemtron Corp., Sweetwater, TN (US); SCHOTT AG, Mainz (DE)

(72) Inventors: Adam O'Ryan, Sweetwater, TN (US); Carsten Schwabe, Horbach (DE); Grant Mason, Barrie (CA)

(73) Assignees: SCHOTT AG, Mainz (DE); SCHOTT GEMTRON CORP., Sweetwater, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/277,238

(22) Filed: Feb. 15, 2019

(65) Prior Publication Data

US 2019/0176514 A1 Jun. 13, 2019

Related U.S. Application Data

(63) Continuation of application No. 15/789,009, filed on Oct. 20, 2017.

(Continued)

(51) Int. Cl.
*B32B 17/10* (2006.01)
*B44F 5/00* (2006.01)
(Continued)

(52) U.S. Cl.
CPC ............ *B44F 5/00* (2013.01); *B32B 17/1022* (2013.01); *B32B 17/10091* (2013.01); *B32B 17/10119* (2013.01); *B32B 17/10256* (2013.01); *B32B 17/10266* (2013.01); *B41M 5/007* (2013.01); *B41M 5/0041* (2013.01); *C03B 27/00* (2013.01); *C03C 17/002* (2013.01); *C03C 17/007* (2013.01); *C03C 17/04* (2013.01); *C03C 17/32* (2013.01); *C03C 17/42* (2013.01); *F24C 15/06* (2013.01); *F24C 15/12* (2013.01); *H05K 5/0017* (2013.01); *C03B 33/04* (2013.01); *C03C 17/36* (2013.01); *C03C 2217/479* (2013.01); *C03C 2217/72* (2013.01); *C03C 2218/119* (2013.01);

(Continued)

(58) Field of Classification Search
CPC .................................. B41M 5/007; B44F 5/00
USPC ..................................................... 428/195.1
See application file for complete search history.

(56) References Cited

U.S. PATENT DOCUMENTS

| 5,322,538 A | 6/1994 | Kondo |
| 6,504,559 B1 | 1/2003 | Newton |

(Continued)

FOREIGN PATENT DOCUMENTS

| CN | 103304153 | 9/2013 |
| DE | 69026322 | 10/1996 |

(Continued)

*Primary Examiner* — Betelhem Shewareged
(74) *Attorney, Agent, or Firm* — Ohlandt, Greeley, Ruggiero & Perle, L.L.P.

(57) ABSTRACT

The present disclosure relates to a decorative panel made of flat glass for electronic household appliances, in particular, for large stationary household appliances. The decorative panel comprises a base body made of thermally tempered flat glass with an operational front and an operational back and has at least one digital print on the operational back.

16 Claims, 2 Drawing Sheets

Related U.S. Application Data

(60) Provisional application No. 62/411,215, filed on Oct. 21, 2016, provisional application No. 62/411,234, filed on Oct. 21, 2016.

(51) Int. Cl.
*B41M 5/00* (2006.01)
*C03C 17/00* (2006.01)
*C03C 17/32* (2006.01)
*F24C 15/06* (2006.01)
*F24C 15/12* (2006.01)
*H05K 5/00* (2006.01)
*C03B 27/00* (2006.01)
*C03C 17/04* (2006.01)
*C03C 17/42* (2006.01)
*C03C 17/36* (2006.01)
*C03B 33/04* (2006.01)

(52) U.S. Cl.
CPC ...... *C03C 2218/31* (2013.01); *C03C 2218/36* (2013.01); *C03C 2218/365* (2013.01); *Y10T 428/2495* (2015.01); *Y10T 428/24851* (2015.01); *Y10T 428/24893* (2015.01); *Y10T 428/24909* (2015.01)

(56) References Cited

U.S. PATENT DOCUMENTS

| | | | |
|---|---|---|---|
| 10,434,818 B2 * | 10/2019 | O'Ryan | C03C 17/32 |
| 2004/0038616 A1 | 2/2004 | Toyoda | |
| 2004/0234735 A1 | 11/2004 | Reynolds | |
| 2005/0151125 A1 | 7/2005 | Erchak | |
| 2005/0152125 A1 * | 7/2005 | Fukuda | H05B 33/04 |
| | | | 362/84 |
| 2006/0150680 A1 | 7/2006 | Hill | |
| 2006/0249245 A1 | 11/2006 | Balling | |
| 2006/0286395 A1 | 12/2006 | Goto | |
| 2007/0098964 A1 | 5/2007 | Yacovone | |
| 2007/0256455 A1 | 11/2007 | Berden | |
| 2009/0130395 A1 | 5/2009 | Lyon | |
| 2009/0239733 A1 | 9/2009 | Kwon | |
| 2011/0250405 A1 | 10/2011 | Sawatsky | |
| 2011/0274891 A1 | 11/2011 | De Rossi | |
| 2012/0324955 A1 | 12/2012 | Lim | |
| 2013/0164483 A1 | 6/2013 | Cites | |
| 2013/0258436 A1 | 10/2013 | Podbelski | |
| 2015/0101849 A1 | 4/2015 | Bockmeyer | |
| 2015/0103123 A1 | 4/2015 | Chen | |
| 2015/0274585 A1 | 10/2015 | Rogers | |
| 2017/0001906 A1 | 1/2017 | Karagöz | |
| 2017/0305784 A1 | 10/2017 | Anselmann | |

FOREIGN PATENT DOCUMENTS

| | | |
|---|---|---|
| DE | 10340754 | 3/2005 |
| DE | 10353992 | 6/2005 |
| DE | 10355448 | 7/2005 |
| DE | 102005013884 | 9/2006 |
| DE | 102014205066 | 10/2015 |
| EP | 1364924 | 11/2003 |
| EP | 1645550 | 4/2006 |
| WO | 2005003048 | 1/2005 |
| WO | 2016008848 | 1/2016 |

* cited by examiner

DECORATIVE PANEL MADE OF FLAT GLASS

CROSS-REFERENCE TO RELATED APPLICATIONS

The present application is a continuation of U.S. patent application Ser. No. 15/789,009, filed on Oct. 20, 2017, which in turn claims the benefit of U.S. Provisional Patent Application Ser. No. 62/411,215, filed on Oct. 21, 2016, and U.S. Provisional Patent Application Ser. No. 62/411,234, filed on Oct. 21, 2016, all of which are herein incorporated by reference.

BACKGROUND OF THE DISCLOSURE

1. Field of the Disclosure

The present disclosure relates to a decorative panel made of flat glass for electronic household appliances, in particular, large stationary household appliances.

2. Description of the Related Art

A decorative panel is primarily a part of an outer casing of an item, which is intended to bring about both a desired aesthetic impression and a technical functionality of the item. Such technical functionalities include, for example, the protection of the encased item from detrimental external influences, the reflection or absorption of electromagnetic radiation, and an easier cleaning or operation of the item by the user. Many of these functionalities are made possible only by an appropriate coating or print. Decorative panels of the aforementioned type find use typically in the household sector, whether as a control panel or a front panel for a household appliance, such as a cooktop, a baking oven, a washing machine, etc., or whether as a panel of a piece of furniture. Especially in the case of household appliances, the requirements placed on the chemical, mechanical, and thermal durability of decorative panels are regarded as being very demanding, because high temperatures, high humidity up to hot steam, or exposure to other aggressive chemicals, such as cleaning agents or hot fat, for example, can occur in cyclic alternation during the operation thereof. Accordingly, the central requirement placed on any print of a decorative panel is its adhesion to the decorative panel under adverse conditions. Failure of adhesion is associated in every case with complete loss of the corresponding functionality. Appropriate test conditions can be taken from the applicable ISO standards, such as, for example, those relating to adhesion tests, resistance to liquids and humidity, influence of heat, evaluation of the degradation of coatings, or resistance to abrasion.

In addition, the design of these items in the household sector is subject to strong fashion trends as well as a prevailing tendency toward integration of an increasing number of different functionalities. This also influences the design of associated decorative panels as well as the manufacturing methods required for them.

Among functional prints, electrically conductive prints have assumed an especially important position. Conductive surface areas and lines that are applied to a decorative panel serve ever more often as integrated capacitive sensors for touch-sensitive switches. In the prior art, such prints have been applied onto decorative panels made of glass by means of screen-printing using glass frit and large silver flakes of several micrometers in size and are burned onto the surface during thermal tempering of the glass. On account of their relatively large layer thickness and the advantageous microstructure created during burning in, the enamel-like layers thereby produced have a low electrical resistance and, associated therewith, a high sensitivity for capacitive touch-sensitive switches.

At present, the market for decorative panels is characterized by a development toward smaller lot sizes with, at the same time, a greater diversity of product variants with a greater complexity of decorations and functionalities to be represented. As a result, the decorations, which have usually been expressed solely in black and white, are being increasingly expanded by colored elements, above all for lettering and symbols. Functionalities include, in addition to the touch-sensitive sensors that have already been named, elements that can be backlit, display capability, or coatings that protect against mechanical, chemical, or thermal stress.

In accordance with the prior art, such panels are manufactured by the application of a plurality of decorative and functional layers by the screen-printing method. Thus, DE 10 2005 013 884 A1 describes a method for manufacturing a control panel for which, by means of screen printing, decorative and electrically conductive layers are applied onto a base body made of glass and subsequently burned in at temperatures of 600 to 700° C. For this purpose, both the colored and the conductive screen-printing pastes contain glass frit, wherein inorganic particles, for example, such as those made of iron oxides, chromium oxides, or spinels are employed as color pigments, and silver particles are employed as conductive material. Enamel-like prints produced in this way exhibit, among other things, an outstanding adhesion to the glass as well as a very good resistance toward thermal and chemical stress.

However, in screen printing, a special mesh as well as a separate process step are needed for each color that is to be applied and for each functional material, respectively. In addition, thermal drying steps must be provided between the application of individual layers. The manufacture of complex decorative panels is thus not economically feasible in low volumes.

Against this background, the object of the present disclosure is to provide a decorative panel made of flat glass that satisfies the requirements presented above for electronic household appliances, in particular, large stationary household appliances, such as baking ovens, washing machines, or devices for heating systems.

SUMMARY OF THE DISCLOSURE

The present disclosure achieves this object with the features of the independent claim. Advantageous enhancements of the present disclosure are presented in the dependent claims.

The present disclosure involves a decorative panel with an operational front and an operational back, which has a base body made of thermally tempered flat glass, hereby characterized in that it comprises at least one digital print on the operational back.

A decorative panel is understood in accordance with the present disclosure to be a part of an outer casing of an item that creates both a desired aesthetic impression and a technical functionality.

The operational front of a decorative panel is understood here to be the outer side in the installed state. Correspondingly, the operational back is understood to be the inner side in the installed state. The digital print according to the present disclosure is found on the operational back of the decorative panel, since it is better protected there from mechanical and chemical influences, such as cleaning agents, for example.

The phrase flat glass is understood to mean glass that has the form of a flat pane or panel in its original manufactured form, thus prior to a further processing with forming methods, such as, for example, cutting, drilling, grinding or bending. The flat glass is thermally tempered according to the present disclosure. The decorative panel functions here as a single-panel safety glass and thus increases user safety in the operation of a household appliance that contains the decorative panel. In case of breakage of the decorative panel due to the effect of a mechanical force, the tempered glass shatters into a large number of very small fragments, so that the danger of injury due to the fragments is clearly reduced in comparison to large shards.

The phrase digital print is understood to be a laterally structured or textured coating that was produced by means of a digital printing method. Digital printing methods are understood here to mean those printing methods with which electronically present printing patterns can be printed onto a printing material without using a physical printing form such as a screen or a template. Included here are, among other things, ink-jet printing, laser printing and aerosol-jet printing. Preferably, a digital print is visible to the naked eye due to its optical properties, especially due to absorption, reflection, or scattering. In this sense the phrase digital print comprises, for example, aesthetic decorations and also the representation of graphic characters or symbols. A digital print according to the present disclosure can also interact in a targeted manner with other technical means, such as a backlighting or a display means.

Since no physical printing forms are used in the case of the digital print, the costs and time expenditure associated therewith for production, delivery, storage, and refurbishing are dispensed with. The elimination of printing forms further makes it possible to apply the colors used or the functional materials more efficiently, since usually material remnants remain on printing forms and must be disposed of after the printing process.

Preferably, the decorative panel is composed of flat glass produced in the float process, wherein the tin side of the floated glass preferably corresponds to the operational front of the decorative panel.

The inventors have therefore established that a digital print that contains organic molecules, especially crosslinked or polymerized organic molecules, has a particularly good adhesion to the flat glass. Thus, in a preferred enhancement, a decorative panel according to the present disclosure has a digital print that contains organic molecules, preferably crosslinked or polymerized organic molecules.

In a preferred enhancement of the present disclosure, the digital print is designed as a raster or screen print in CMYKW five-color printing, preferably expanded by at least one special color and contains corresponding coloring means. In this way, the digital print can represent different mixtures of colors including photo-realistic graphics with high color brilliance in a single process step. Therefore, special colors serve, for example, for expanding the color palette represented by the digital print or for the reproduction of specific, defined full-tint colors that cannot be reproduced exactly in the CMYKW five-color print.

In addition, the inventors have discovered that a decorative panel according to the present disclosure, which has a digital print that preferably contains crosslinked or polymerized organic molecules has a cross-cut rating of 0 or 1 according to DIN EN ISO 2409 after storing in distilled water for 24 hours at room temperature. Preferably, the digital print has a cross-cut rating of 0 or 1 after storing in distilled water for 120 hours at room temperature.

These good adhesion values could be achieved according to the present disclosure or one of its enhancements even if the decorative panel does not have an adhesion-promoting layer between the base body and the digital print. This is particularly advantageous, since the decorative panel can be manufactured in this way more cost effectively. For this reason, in another preferred enhancement, the decorative panel does not have an adhesion-promoting layer between the base body made of flat glass and the digital print.

In a preferred enhancement of the present disclosure, the flat glass employed is a soda-lime glass, the thickness of which is preferably 2 mm to 8 mm, more preferably 3 mm to 6 mm. A soda-lime glass is understood to be a glass that has a mass fraction based on oxide of 70-76 wt. % $SiO_2$, 11-17 wt.-% $Na_2O$ as well as 8-16 wt.-% CaO as principal component, and is characterized by a transformation temperature of less than 600° C. This is particularly energetic for the thermal tempering and is thus also advantageous economically.

Glass thicknesses of less than 2 mm are not suitable for thermal tempering in industrial manufacturing plants, since extremely high cooling rates that are difficult to produce on a large technical scale would be required for this. Starting from glass thicknesses of at least 3 mm, soda-lime glasses can be thermally tempered with comparatively small expense and with high yield. Glass thicknesses above 8 mm have a large installed depth and a heavy weight. In contrast, glasses with thicknesses of 6 mm at most, which have a mass loading of a maximum 15 kg/m$^2$ are preferably used.

Under certain circumstances, it may be of advantage to provide the decorative panel with additional digital or non-digital prints over the digital print on the operational front or back. For example, if logos or similar markings are to be always printed identically on the front of the decorative panel for several different embodiments of the digital print, it may be meaningful economically to introduce such elements by means of a non-digital printing method, for example, by means of screen printing. As another example, a print on the front can also be fine-tuned to the digital print and the thickness of the decorative panel, in order to produce three-dimensional depth effects of the decoration in a mutual interaction.

It may be particularly advantageous in this case to use enamel-like colors that comprise inorganic pigments and glass frit for a print on the front, since these can be burned onto the surface of the front and are thereby insensitive to the chemical and mechanical stresses that are particularly strong there. Moreover, such inorganic pigments may involve effect pigments, for example, in order to achieve a pearl luster, mirror or metal effects. These types of effects may also be obtained by way of prints or coatings by means of screen or template printing, roller coating, spray coating or sputtering. In addition, such prints can preferably be employed on the front, for example, in order to achieve anti-reflection, an increase in the scratch resistance, or an easier cleaning.

Thus, in another preferred enhancement, the decorative panel comprises, in addition to the digital print, at least one print or coating on the operational front or back that preferably contains inorganic pigments.

In another preferred enhancement, an indentation is formed on the front of the decorative panel, which has a digital print. Indentations on the front in this case, for example, may serve for the haptic perception of control elements applied on the back or behind the decorative panel. Preferably, a print in the indentation in such a case can support the functionality of the control element. A print in indentations was not previously technically possible with the usual methods in the prior art. Due to the use of a digital printing method, in particular by employing ink-jet printing, it was possible for the inventors to also create prints for the first time in indentations of decorative panels.

In another preferred enhancement, at least one raised region of at least 250 µm height is formed on the front of the decorative panel, and at least one region has at least one digital print outside the raised region. Similar to printing in indentations, decorative panels that have simultaneously a raised region and a print in a region outside the raised region on the same side are not known in the prior art. Due to the use of digital printing methods, it was possible for the inventors for the first time to also create decorative panels having such features.

In another preferred enhancement, the decorative panel has a coating or print that protects against thermal, chemical, or mechanical effects. More preferably, such a protective print likewise is a digital print. In addition, such a coating or prints can also be applied by means of screen printing, roller application, spray coating, slot die coating, or similar methods.

In another preferred enhancement, the decorative panel has an electrically conductive digital print. A conductive digital print may be composed essentially of metal, for example. Preferably, a conductive digital print is composed of silver. It has been shown that silver is particularly well suitable for the production and use of decorative panels, due to its conductivity, oxidation stability, and for economic reasons. A conductive digital print in this case can also interact with non-conductive prints, for example, in that the non-conductive prints form a lateral or vertical boundary between conductive prints, as isolators or insulators, or in that they serve as dielectric layers, for example in a capacitor structure in the case of a multilayer structure.

In another preferred enhancement, the decorative panel has an adhesion-promoting layer between the base body and the digital print, in order to still further improve the adhesion of the digital print in an advantageous manner. Due to the arrangement on the back of the decorative panel, since the user views the digital print through the glass and through the adhesion-promoting layer, such an adhesion-promoting layer must be transparent in every case. If it were not, it would hinder the view onto the digital print.

A particularly advantageous property of a decorative panel is to conceal at least one region of the item of which it is part of the outer casing. For this, however, the print needs to attenuate the light passing through it so intensely that it is opaque under the usual lighting conditions. In an enhancement of the present disclosure, the digital print thus has a spectral optical density of more than 3 in the visible wavelength region of 380 to 780 nm, measured with a spectral densitometer in transmitted light. For such an intense attenuation, layer thickness and absorption of the digital print need to be fine-tuned to each other, and the digital print should not have any free intermediate spaces, for example in the form of so-called pinholes, between the individual constituent pixels.

It has been demonstrated as particularly advantageous if the digital print is composed of at least two layers that are disposed behind one another and have a spectral optical density of less than 2 between 380 nm and 780 nm. Several effects can be attained thereby. On the one hand, the resulting optical density of the digital print can be increased due to a more intense absorption when compared with a digital print made of an individual layer, if, for example, the resulting total thickness of the digital print is greater than that of an individual layer. Moreover, the inventors have surprisingly established, however, that the resulting optical density of a digital print composed of at least two layers, even with the same resulting layer thickness and the same materials being used, can be increased when compared with a digital print composed of a single layer. This additional screening effect is probably attributable to the fact that the second layer of the digital print masks possibly present intermediate spaces causing defects that lie between individual pixels, so that the multilayer digital print overall has fewer such defects.

Moreover, a digital print composed of two layers having recesses in one of the two layers can be executed in a simple and targeted manner, so that the spectral optical density of the decorative panel is increased locally therein. In this way, for example, a backlighting through a display element, such as e.g., an LED or an LCD display, can be made possible, which is concealed behind the digital print in the non-illuminated state.

Particularly in the case of weakly illuminating display elements, it has been demonstrated to be advantageous here if the digital print is composed of at least two layers and, for example, has a recess in at least one layer at the position of a display element, and the at least one other layer, at this place in the wavelength region between 380 nm and 780 nm, has a lower spectral optical density than the first layer in the region outside the recessed region. It has been demonstrated to be advantageous if the spectral optical density of the layer that has the recess has a value between 1 and 3 between 380 nm and 780 nm and that of the at least one other layer lies between 0.3 and 2.

In addition, it has been shown in this case that if the spectral optical density of the layer having the recess lies between 2 and 3 and that of the at least one other layer lies between 0.3 and 1.4, the occurrence of a so-called corona effect in the case of backlighting can additionally be greatly reduced or even avoided. Here, the phrase corona effect is to be understood as an illumination situation in which light that is illuminated in the region of a recess in at least one layer from the back onto the decorative panel not only passes through this recess, but also passes at least partially through the layer surrounding the recess. Among other things, this can lead in an undesired way to a reduction in the perceptible contrast of the illuminated recess in comparison to its surroundings as well as to a visual expansion of the recessed structure.

Correspondingly, an enhancement of the present disclosure provides that the digital print is composed of at least two layers, at least one layer of which has a recess, and at least one other layer has a spectral optical density between 380 and 780 nm, at least in the region of the recess, that is lower than the spectral optical density of the first layer at a place outside the recessed region.

According to another preferred enhancement of the present disclosure, the decorative panel involves a control panel or an outer door glazing for electronic household appliances. These household appliances preferably involve stationary electronic household appliances, such as, e.g., baking ovens, cooktops, refrigerators, coffee machines, microwave appliances, steamers, range hoods, dishwashers, washing machines, washer-driers, devices for heating systems or combination appliances having a plurality of these functionalities, such as, e.g., baking ovens with microwave function or combined washer-driers that can both wash as well as dry the laundry.

The present disclosure will be described in more detail based on an exemplary embodiment of a decorative panel according to the present disclosure that is shown in the figures. In this case, a decorative control panel for a household appliance is selected as an exemplary embodiment.

In one embodiment, the present disclosure provides a decorative panel comprising a base body made of thermally tempered flat glass, wherein the base body has an operational front and an operational back, and at least one digital print on the operational back. The digital print contains organic molecules.

In another embodiment, the present disclosure provides a decorative panel comprising a base body made of thermally tempered flat glass, wherein the base body has an operational front and an operational back, and at least one digital print on the operational back. The base body is composed of soda-lime glass.

In another embodiment, the present disclosure provides a decorative panel comprising a base body made of thermally tempered flat glass, wherein the base body has an operational front and an operational back, and at least one digital print on the operational back. The base body has a thickness of 2 mm to 8 mm.

DETAILED DESCRIPTION OF THE DISCLOSURE

Figure 1:
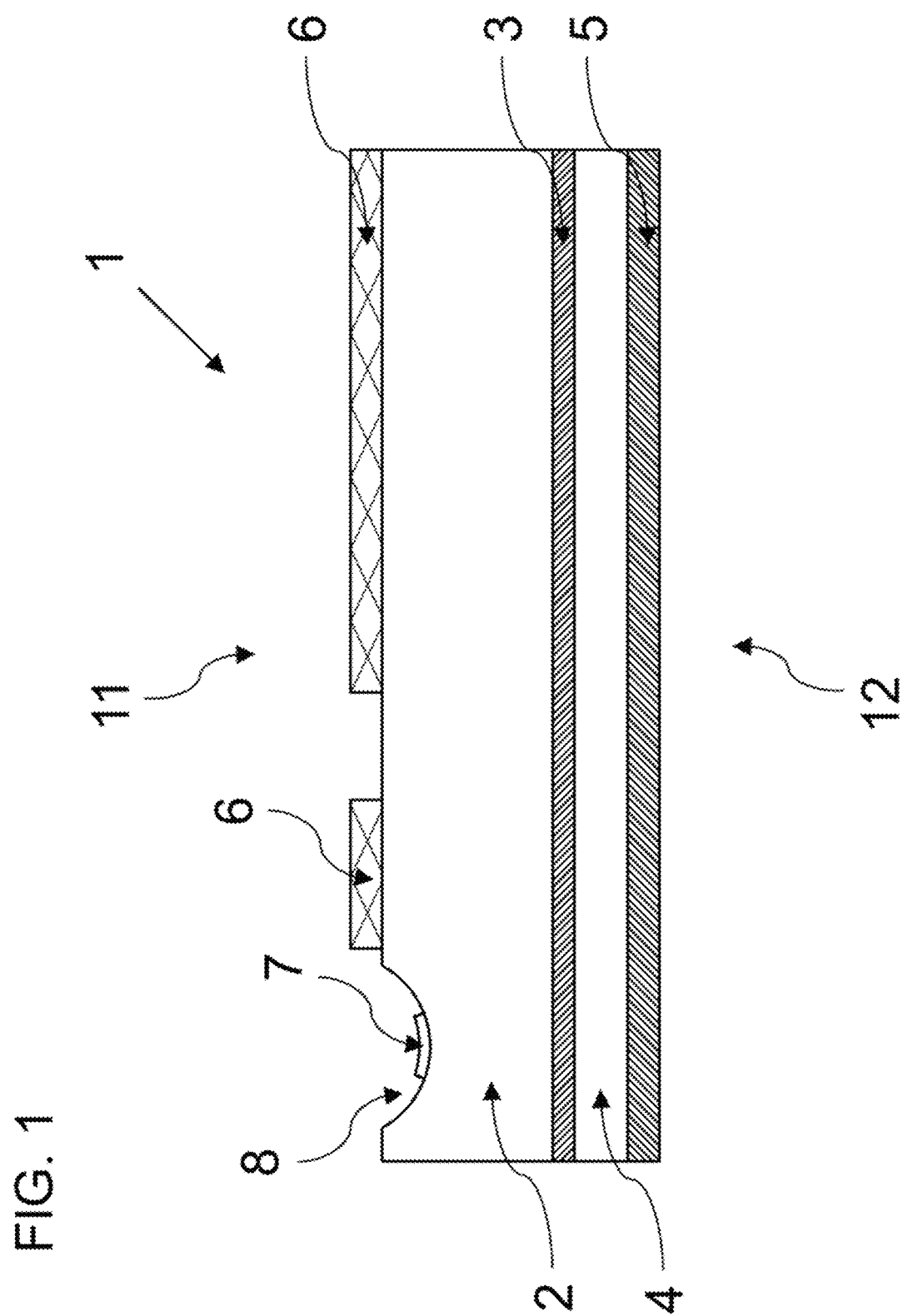
FIG. 1 shows a cross section through a decorative control panel in a schematic representation.
Figure 2:
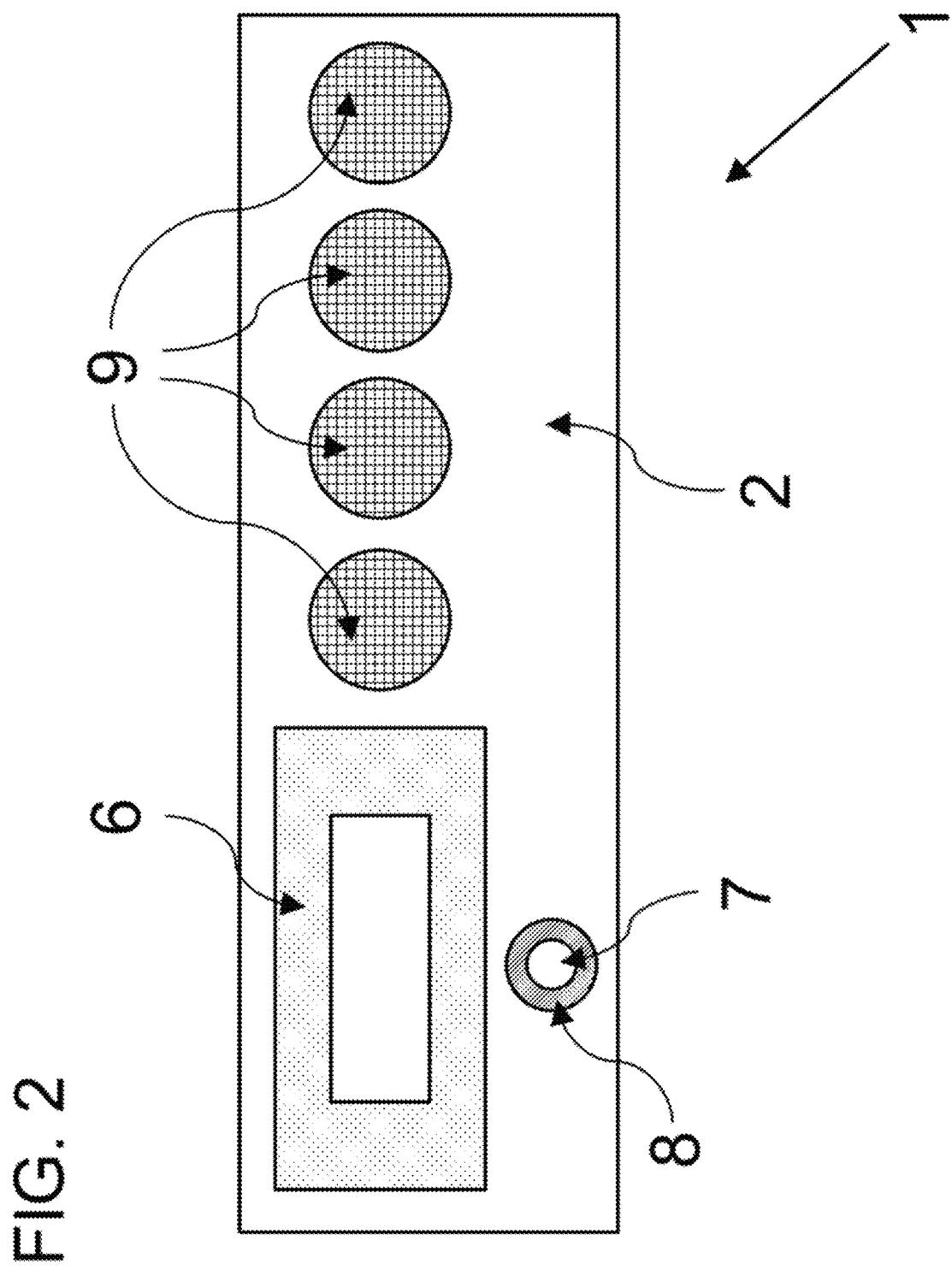
FIG. 2 shows a view onto the operational front of a decorative control panel.

FIGS. 1 and 2 show a decorative panel 1 that has an operational front 11 as well as an operational back 12 and a base body 2 made of thermally tempered flat glass. The decorative panel 1 has an adhesion-promoting layer 3, a digital print 4, as well as a protective coating 5 on the back 12.

On the front 11, the decorative panel 1 comprises an indentation 8, a print 7 printed in the indentation, as well as another decorative or functional print 6 that has a recess.

In addition, the decorative panel 1 in FIG. 2 has drilled holes 9 in the form of through-passage openings through the entire thickness of the glass.

The present disclosure will be explained in more detail below on the basis of further embodiment examples.

Example 1

A 4-mm thick glass pane or panel of floated soda-lime glass with low iron content is provided. This glass panel is cut to size mechanically by means of scoring and breaking. For formation of the desired outer contour of the blank decorative panel as well as of a C cut of the edges, the cut glass panel is processed by grinding. In the next step, a spherical indentation with a diameter of 14 mm at the surface and a depth of 1 mm is made on the operational front of the blank decorative panel by means of grinding and polishing. In the process, the tin side of the glass is chosen as front. Subsequently, a cylindrical passage with a diameter of 50 mm is drilled in the blank with a diamond drill. After this method step of forming, the blank is cleaned in order to remove residues from the surfaces of the blank.

The blank thereby formed and cleaned is printed on its front with a two-color logo by means of screen printing using inorganic pigments and glass frit. This print is initially pre-dried in an oven. After drying of the print, the blank is thermally tempered in a tempering oven, wherein the two-color logo is burned onto the front. Prior to further processing of the blank decorative panel tempered in this way, it is cooled to a temperature of less than 100° C.

Directly afterwards, the tempered blank decorative panel is printed with a photo-realistic graphic on the operational back on an ink-jet printer. The ink is hardened during the printing process on the blank decorative panel by means of UV LEDs integrated in the printing head. Optionally, the print is coated over the entire surface with a transparent protective coating using the same printer in order to protect it against mechanical damage. The protective coating is likewise hardened by means of UV LEDs.

Subsequently, the substrate is turned over and a single-color pictogram is printed into the spherical indentation on the operational front and this print is likewise hardened by means of UV LEDs.

The decorative panel produced in this way accordingly has a base body made of thermally tempered, 4-mm thick, floated soda-lime flat glass with a spherical indentation on the front, a digital print executed as a photo-realistic graphic on the back, as well as a digital print that is executed as a single-color pictogram in the indentation on the front. It additionally has a print that contains inorganic pigments, which is executed as a two-color logo on the front. Moreover, it optionally has a protective coating that protects the digital print against mechanical damage.

Example 2

The blank decorative panel is fabricated from soda-lime glass with a thickness of 3 mm by means of mechanical cutting, grinding, cleaning, and thermal tempering in analogy to Example 1.

Immediately after cooling, the tempered and cooled blank decorative panel is printed on the operational back, which corresponds to the atmospheric side of the soda-lime glass, by means of an ink-jet printer, with a single-color black print, which has a rectangular recess for a display device as well as additional recesses in the form of pictograms, which, in the installed state, for example installed as a control panel in a baking oven, can be backlit from the operational back with lighting means.

Optionally, electrically conductive structures made of silver with use of nanoparticle ink are applied around the recesses or at least on one side of the recesses by means of ink-jet printing. These silver structures are thermally dried in an oven and thereby attain a specific electrical resistance of less than 250 µOhm cm. They can be used, for example, as sensors for capacitive touch sensors.

The decorative panel produced in this way accordingly has a base body made of thermally tempered, 3-mm thick, floated soda-lime flat glass on the back, a digital print executed as a single color, black, with various recesses, as well as, optionally, a digital print that is executed in the form of electrically conductive structures.

Example 3

The method of fabrication of Example 3 corresponds to that mentioned in Example 2, with a transparent adhesion-promoting print being applied prior to the application of the single-color black print by means of the same ink-jet printer.

The resulting decorative panel thus also corresponds to the panel of Example 2, additionally having an adhesion-promoting layer between the flat glass and the digital print.

The person skilled in the art would understand that the present disclosure is not limited only to the exemplary embodiments described above on the basis of the figures, but rather can be varied in many ways within the scope of the subject matter of the patent claims. In particular, the features of individual embodiment examples may also be combined with one another. In addition, it is possible in an advantageous way to allow individual process steps of the method according to the present disclosure to proceed several times in succession or to add additional process steps prior to, in between, or after the steps required in accordance with the present disclosure.

What is claimed is:

1. A decorative panel, comprising:
   a base body made of thermally tempered flat glass, wherein the base body has an operational front and an operational back;
   at least one digital print on the operational back, wherein the at least one digital print on the operational back contains organic molecules; and
   at least one indentation on the operational front of the decorative panel, wherein the at least one indentation has an additional digital print therein.

2. The decorative panel according to claim 1, wherein the organic molecules are crosslinked or polymerized organic molecules.

3. The decorative panel according to claim 1, wherein the digital print on the decorative panel has a cross-cut rating of 0 or 1 according to DIN EN ISO 2409 after storing the printed decorative panel in distilled water for 24 hours at room temperature.

4. The decorative panel according to claim 1, wherein the decorative panel does not have an adhesion-promoting layer between the base body and the digital print.

5. The decorative panel according to claim 1, wherein the base body is composed of soda-lime glass.

6. The decorative panel according to claim 1, wherein the base body has a thickness of 2 mm to 8 mm.

7. The decorative panel according to claim 1, wherein the base body has a thickness of 3 mm to 6 mm.

8. The decorative panel according to claim 1, wherein the decorative panel comprises, in addition to the digital print, at least one print or coating on the operational front or back that contains inorganic pigments.

9. A decorative panel, comprising:
   a base body made of thermally tempered flat glass, wherein the base body has an operational front and an operational back;
   at least one digital print on the operational back, wherein the digital print contains organic molecules; and
   at least one raised region of at least 250 µm height on the operational front of the decorative panel, wherein at least one region outside the raised region has an additional digital print on the operational front.

10. The decorative panel according to claim 1, wherein the decorative panel has a coating that protects against thermal, chemical or mechanical effects.

11. The decorative panel according to claim 1, wherein the digital print is electrically conductive.

12. The decorative panel according to claim 1, further comprising a transparent adhesion-promoting layer between the base body and the digital print.

13. A decorative panel, comprising:
    a base body made of thermally tempered flat glass, wherein the base body has an operational front and an operational back; and
    at least one digital print on the operational back, wherein the digital print contains organic molecules,
    wherein the at least one digital print has an optical density of more than 3 in the wavelength region from 380 to 780 nm.

14. A decorative panel, comprising:
    a base body made of thermally tempered flat glass, wherein the base body has an operational front and an operational back; and
    at least one digital print on the operational back, wherein the digital print contains organic molecules,
    wherein the at least one digital print is composed of at least two layers arranged one behind the other and each having an optical density of less than 2 between 380 and 780 nm.

15. A decorative panel, comprising:
    a base body made of thermally tempered flat glass, wherein the base body has an operational front and an operational back; and
    at least one digital print on the operational back, wherein the digital print contains organic molecules
    wherein the at least one digital print is composed of at least two layers, at least one layer of which has a recess, and at least one other layer has an optical density between 380 and 780 nm, at least in the region of the recess, that is lower than the optical density of the first layer at a place outside the recessed region.

16. A electronic household appliance comprising the decorative panel of claim 1 as a control panel or outer door glazing.

* * * * *